Jan. 10, 1956 O. H. SCHMITT ET AL 2,730,620
VARIABLE FREQUENCY SIGNAL GENERATOR
Original Filed May 25, 1948
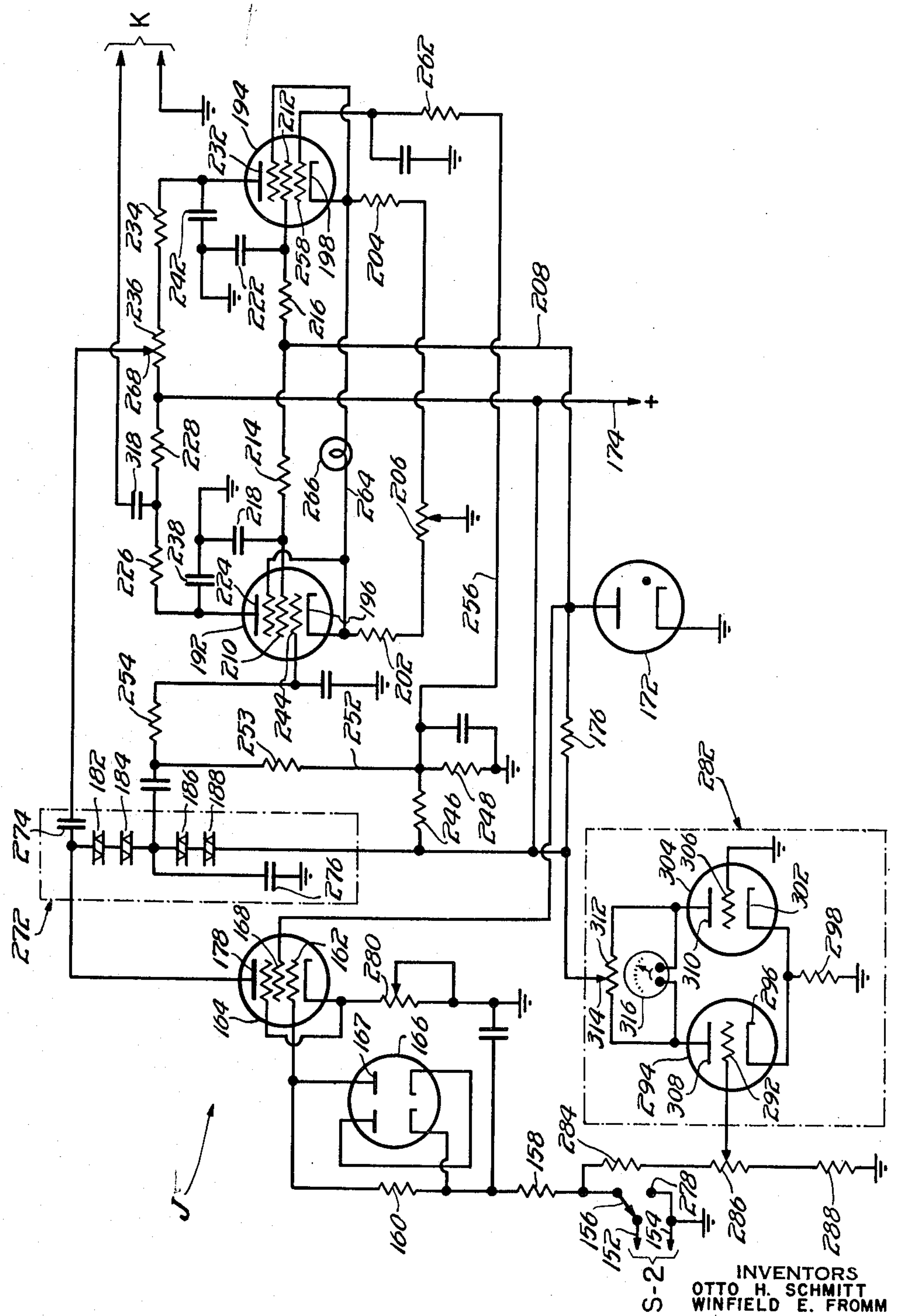
INVENTORS
OTTO H. SCHMITT
WINFIELD E. FROMM
BY Curtis, Morris + Safford
ATTORNEYS United States Patent Office 2,730,620

Patented Jan. 10, 1956

2,730,620

VARIABLE FREQUENCY SIGNAL GENERATOR

Otto H. Schmitt, Minneapolis, Minn., and Winfield E. Fromm, Roslyn, N. Y., assignors to Airborne Instruments Laboratory, Inc., Mineola, N. Y.

Original application May 25, 1948, Serial No. 29,018. Divided and this application May 15, 1951, Serial No. 226,513

5 Claims. (Cl. 250—36)

This invention relates to electrical oscillators for generating variable frequency signals. More particularly, the invention relates to signal generating apparatus wherein the frequency of the generated signal is controlled by a direct control current.

This application is a division of application Serial No. 29,018, filed May 25, 1948, now U. S. Patent No. 2,556,556. The oscillator arrangement described herein and embodying the present invention has particular utility in data transmitting systems such as is described in the parent application and also has utility in other types of data transmission systems such as telescribing teletype systems, communication systems, etc. Various other applications wherein it is desired to control the frequency of an audio or radio frequency signal in accordance with the magnitude of a direct control signal are well apparent to those skilled in this field.

The invention is described as embodied in a relatively simple, highly stable, audio signal generator, wherein relatively precision control of the generated signal is maintained over long periods of time.

The invention accordingly consists in the features of construction, combinations of elements, arrangements of parts and methods of operations as will be exemplified in the structures and sequences and series of steps to be hereinafter indicated and the scope of the application of which will be set forth in the following claims.

In this specification and the accompanying drawings, there is shown and described a preferred embodiment of the invention; but it is to be understood that this is not intended to be exhaustive nor limiting of the invention, but on the contrary is given for purposes of illustration in order that others skilled in the art may fully understand the invention and the principles thereof and the manner of applying it in practical use so that they may modify and adapt it in various forms, each as may be best suited to the conditions of a particular use.

The various aspects, objects and advantages of the invention will be in part pointed out in and in part apparent from the following description considered in conjunction with the accompanying drawing which shows the circuit diagram of a variable frequency oscillator embodying the invention.

The magnitude data which are to be transmitted or used to control other apparatus are applied by a direct current signal S–2, the magnitude of which is a function of the data, to the terminals 152 and 154 of the variable frequency oscillator J. Terminal 152 is connected through a switch arm 156, and resistances 158 and 160 to a control grid 162 of a pentode vacuum tube 164.

The current through the tube 164, as will be explained below, controls the frequency of the oscillator J and, therefore, must not be subject to variations caused by factors other than the applied signal S–2. A dual diode 166, the two sections of which are connected in series and are in turn connected in parallel with the resistance 160, serves the dual function of providing negative bias for the tube 164, compensating for changes in the filament voltage applied to tube 164. This compensation takes place in the following manner: when the filament or cathode of an ordinary vacuum diode is heated, there is electron emission from cathode to plate even though no positive voltage is applied to the plate. This action produces a negative voltage on the plate of the tube, relative to the cathode. In the present application the voltage produced, by this effect, on anode 167 of tube 166 provides bias voltage for the tube 164. The filaments or heaters of tube 166 and tube 164 are connected to a common source so that a change in the voltage applied to the heater circuit of tube 164 simultaneously affects tube 166. Assume an increase in these heater voltages which will tend to increase the plate current through tube 164. This increased heater voltage will increase also the electron emission of the cathode of tube 166, thus placing an increased negative voltage on anode 167 of this tube and increasing thereby the negative voltage on the grid 162 of tube 164; thus providing automatic compensation for increase in heater voltage. If the heater voltage decreases, compensation takes place by reducing the negative bias on tube 164.

As a further measure to maintain constant plate current through tube 164, the voltage of screen 168 is regulated by a gaseous discharge type voltage regulator tube 172, which is connected to the positive voltage supply lead 174 through a dropping resistor 176. The screen 168, is, of course, more influential in holding the plate current constant in this type tube than is the voltage of anode 178 and the plate current remains substantially constant, even with considerable variation in the plate voltage of the tube.

Voltage is supplied to the anode 178 through four varistors 182, 184, 186, and 188, which are connected in series between the anode 178 and the plate supply lead 174. These varistors, the resistance of which is a function of the current through tube 164, are connected also in a phase-shift feed-back circuit of a two stage oscillator to control the frequency of oscillation.

Two pentode tubes 192 and 194 are connected as a cathode-coupled oscillator. Cathodes 196 and 198 of these tubes are connected to ground through resistances 202 and 204, respectively, and through variable resistance 206, common to both circuits, for balancing the plate current through the tubes. Voltage for screens 210 and 212 of these tubes is provided through lead 208 from the same regulated power supply that provided the screen voltage for tube 164. Resistors 214 and 216 are connected in series with screen grids 210 and 212, respectively, and together with bypass condensers 218 and 222, are provided to suppress parasitic oscillation. Anode 224 of tube 192 is connected through series resistors 226 and 228 to the positive voltage supply lead 174. Anode 232 of tube 194 is connected through series resistors 234 and 236 to supply lead 174. Resistors 226 and 234 are connected directly at the tube socket terminals, as are bypass condensers 238 and 242, for suppressing parasitic oscillations in the plate circuits.

Control grid 244 of tube 192 is biased positively with respect to ground by a voltage divider circuit comprising resistances 246 and 248 which are connected between the supply lead 174 and ground. A lead 252 is connected through a series resistor 253 to a point between the two resistances and to grid 244 through a suppressor resistance 254. Lead 256 is connected to the same point between resistors 246 and 248 and supplies bias voltage to control grid 258 of tube 194 through suppressor resistance 262.

Tube 192 is coupled to tube 194 by a lead 264 which is connected between cathode 196 and cathode 198. A lamp 266 is connected in series with this lead for the purpose of stabilizing the amplitude of oscillation. Lamp 266 has a positive temperature coefficient and, as the amplitude of oscillation increases, the current through lead 264 rises thus increasing the resistance of lamp 266 which decreases the cathode coupling and, thus, the amplitude of oscillation. Adjustment of the tapped resistance 206 provides direct current balance and eliminates the flow of direct current through the lamp 266. The amplitude of oscillation may be adjusted to a desired value by varying the amount of feedback through adjustment of tap 268 on resistance 236.

Energy is fed back from the anode circuit of tube 194 through the adjustable tap 268 of resistance 236 to a phase-shift network, enclosed within the broken line 272, which applies the feed-back signal to the control grid 244 of tube 192.

The phase of the voltage delivered by the anode circuit of tube 194 is such that maximum amplitude of oscillation will occur if there is no phase shift in the circuit 272. This phase-shift circuit 272, which includes a condenser 274, the four varistors 182, 184, 186, and 188, and a condenser 276, is frequency sensitive and there is only one frequency at which zero phase shift takes place. The amount by which the phase is shifted in this circuit varies rapidly on either side of this critical frequency; the oscillator, therefore, generates that frequency for which there is zero phase shift. This frequency is given by the expression:

$$f=\frac{1}{2\pi\sqrt{(R_{182}+R_{184})(R_{186}+R_{188})C_{274}C_{276}}}$$

where $R_{182}$, $R_{184}$, $R_{186}$, and $R_{188}$ are the resistance values of the correspondingly numbered varistors, and $C_{274}$ and $C_{276}$ are the capacities of condensers 274 and 276, respectively.

If the sum of $R_{182}$ and $R_{184}$, denoted by R, is made equal to the sum of $R_{186}$ and $R_{188}$, and $C_{274}$ is made equal to $C_{276}$ and denoted by C, then the frequency of the oscillator is given by the expression:

$$f=\frac{1}{2\pi RC}$$

The frequency may be varied accordingly by simultaneously changing the capacity of the two condensers or by changing the resistance of the varistors. In this circuit the resistance is the value that is changed. Because the resistance of the varistors changes with change in current through them the frequency of oscillation may be controlled or varied, accordingly, by changing the plate current through tube 164 and consequently the direct current through the varistors. This current is controlled by the signal S–2 which is applied to the control grid 162 of tube 164. The frequency at which the oscillator operates when there is no input voltage, i. e. when switch arm 156 is connected to terminal 278, is adjusted by varying a rheostat 280 in the cathode circuit of tube 164. This oscillator, for the purposes of this example, is assumed to operate over the frequency range from 200 to 400 cycles per second.

In order to indicate the frequency at which the oscillator is operating, a bridge circuit, generally indicated at 282, is utilized to measure the direct voltage applied to the oscillator control tube 164. A voltage divider, consisting of resistances 284, 286, and 288, is connected between switch arm 156 and ground. A tap on resistor 286 is connected to control grid 292 of a triode vacuum tube 294, which is coupled through its cathode 296 and a resistance 298 to cathode 302 of a similar tube 304. Control grid 306 of tube 304 is connected to ground. Anodes 308 and 310 of tubes 294 and 304, respectively, are connected together through a balancing potentiometer 312 the adjustable tap of which is connected to the supply lead 174. The bridge is initially balanced, with zero voltage applied to grid 292, by adjusting the variable tap 314. Voltage applied to grid 292 unbalances the circuit by an amount indicated on a voltmeter 316 connected between the two anodes. This meter may be calibrated conveniently in frequency and so indicate directly the frequency of oscillation.

The output circuit of oscillator J is coupled from the anode circuit of tube 192 through a condenser 318 and is connected to the input of any desired apparatus indicated by the symbol K.

What is claimed is:

1. A variable frequency oscillator circuit comprising electronic amplification means having an input and an output circuit, a frequency-responsive network including a first series-connected varistor and condenser and a second parallel-connected varistor and condenser, circuit means connecting said first varistor and condenser between said input and output circuits and said second varistor and condenser across said input circuit, a pentode vacuum tube having a control grid and an anode-cathode circuit, circuit means connecting said varistors in series with said anode-cathode circuit, and control means for varying the potential between said cathode and said control grid.

2. A variable frequency oscillator circuit comprising an electronic amplifier including first and second amplifier tubes and having an input and an output circuit, each of said tubes having a cathode, cathode-coupling means for feeding energy from the first to the second tube, a positive feed-back circuit connected between said output and input circuits, a frequency-responsive network connected into said feed-back network and arranged to affect the transmission of signal energy therealong, said frequency-responsive network including and being under the control of at least two varistors, a pentode vacuum tube having a control grid and an anode-cathode circuit, circuit means connecting said varistors in series with said anode-cathode circuit, and control means for varying the potential between said cathode and said control grid.

3. A variable frequency oscillator circuit comprising an amplifier having input and output circuits including first and second amplifier tubes each having a cathode, means coupling said cathodes together including a positive temperature coefficient resistance element, a positive feed-back circuit connected between said output and input circuits, a frequency-responsive network connected into said feed-back network and arranged to affect the transmission of signal energy therealong, said frequency-responsive network including and being under the control of at least one varistor, and a variable source of control current connected to said varistor.

4. A variable frequency oscillator circuit comprising an electronic amplifier including first and second amplifier tubes and having an input and an output circuit, each of said tubes having a cathode, cathode-coupling means for feeding energy from the first to the second tube, a positive feed-back circuit connected between said output and input circuits, a frequency-responsive network connected into said feed-back network and arranged to affect the transmission of signal energy therealong, said frequency-responsive network including a first condenser and a first varistor connected in series between said output and input circuits and a second condenser and a second varistor connected in a shunt circuit across said input circuit, a pentode vacuum tube having a control grid and an anode-cathode circuit, circuit means connecting said varistors in series with said anode-cathode circuit, and control means for varying the potential between said cathode and said control grid.

5. A variable frequency oscillator circuit comprising an electronic amplifier including first and second amplifier tubes and having an input and an output circuit, each of said tubes having a cathode, cathode-coupling means for feeding energy from the first to the second tube, a positive temperature coefficient lamp filament connected in series with said cathode-coupling means, a positive feed-back circuit connected between said output and input circuits, a frequency-responsive network connected into said feedback network and arranged to affect the transmission of signal energy therealong, said frequency-responsive network including two varistors arranged to control the frequency response of said network, a pentode vacuum tube having a screen grid, a control grid and an anode-cathode circuit, a source of regulated voltage connected to said screen grid, circuit means connecting said varistors in series with said anode-cathode circuit, and control means for varying the potential between said cathode and said control grid thereby to vary the current through said varistors to vary the frequency characteristics of said network and the frequency of the signal generated by said oscillator.

References Cited in the file of this patent

UNITED STATES PATENTS

| | | |
|---|---|---|
| 2,268,872 | Hewlett | Jan. 6, 1942 |
| 2,319,965 | Wise | May 25, 1943 |
| 2,385,260 | Cox | Sept. 18, 1945 |
| 2,407,293 | Shepherd | Sept. 10, 1946 |
| 2,418,842 | Kinsburg | Apr. 15, 1947 |
| 2,556,556 | Schmitt | June 12, 1951 |
| 2,586,803 | Fleming | Feb. 26, 1952 |